July 29, 1941.   G. I. ANDERSON   2,250,740
TIRE CASING SPREADER
Filed Feb. 3, 1939   9 Sheets-Sheet 1

Inventor
Gustav I. Anderson
By his Attorneys

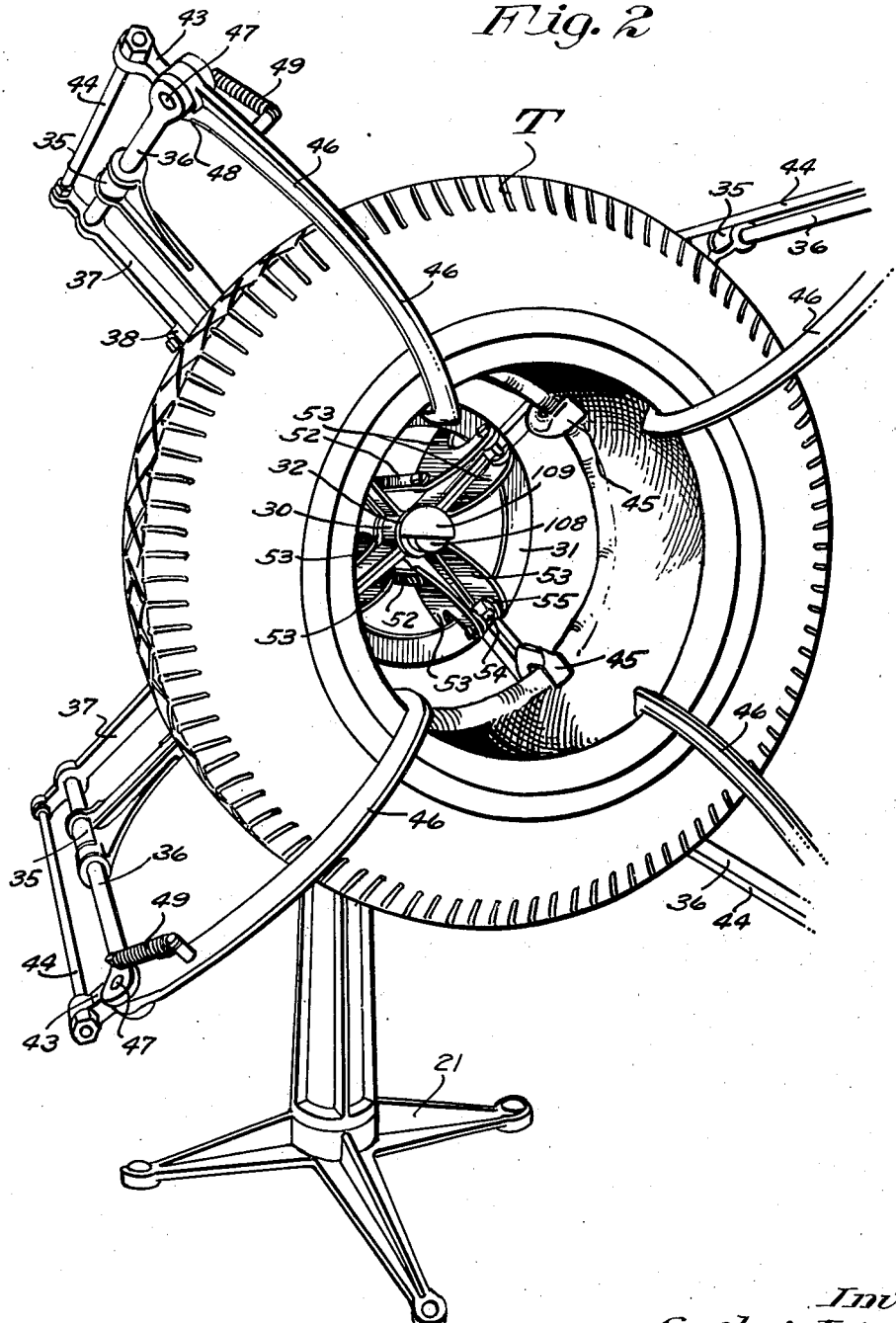

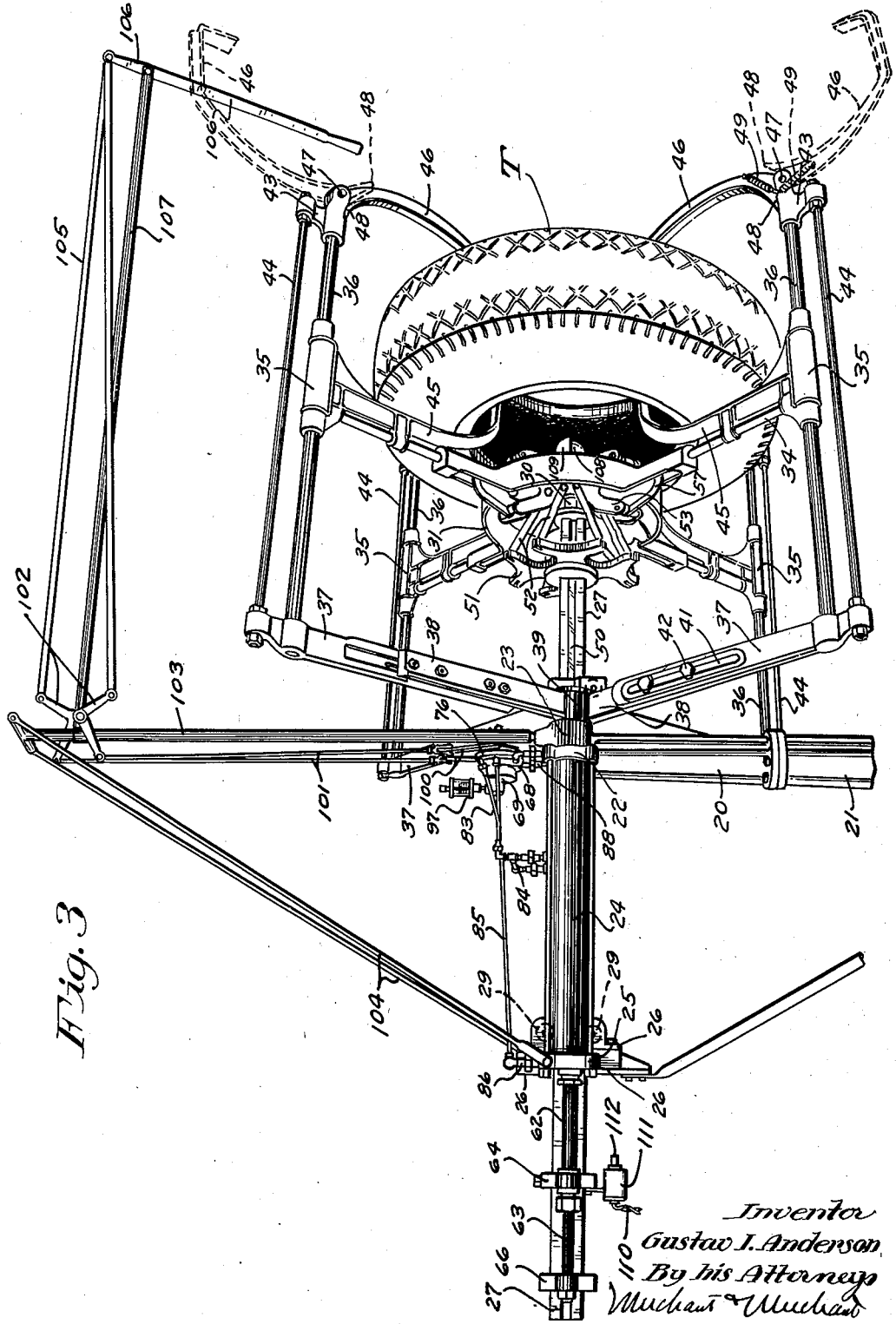

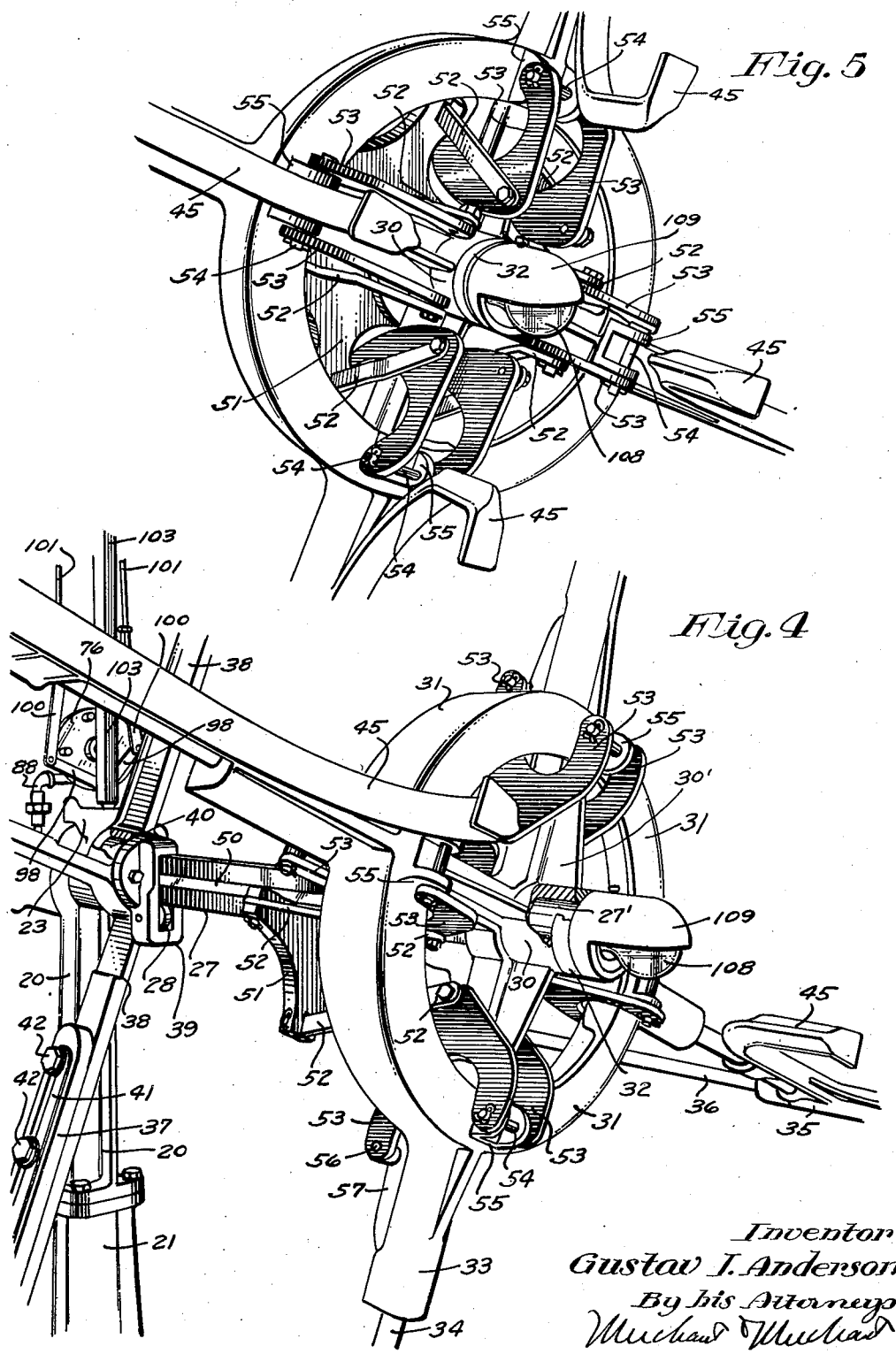

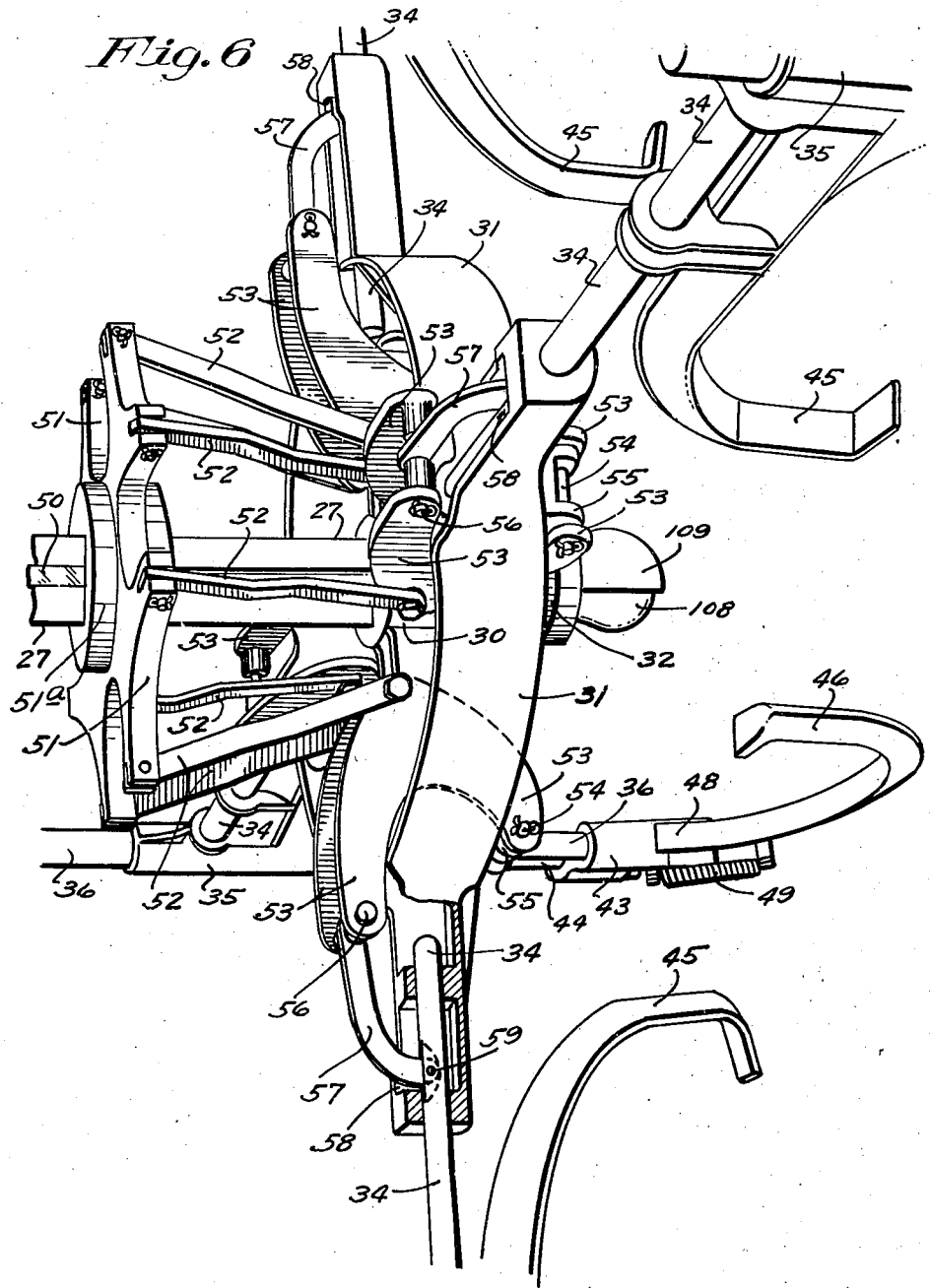

July 29, 1941.  G. I. ANDERSON  2,250,740
TIRE CASING SPREADER
Filed Feb. 3, 1939  9 Sheets-Sheet 7

Inventor
Gustav I. Anderson
By his Attorneys

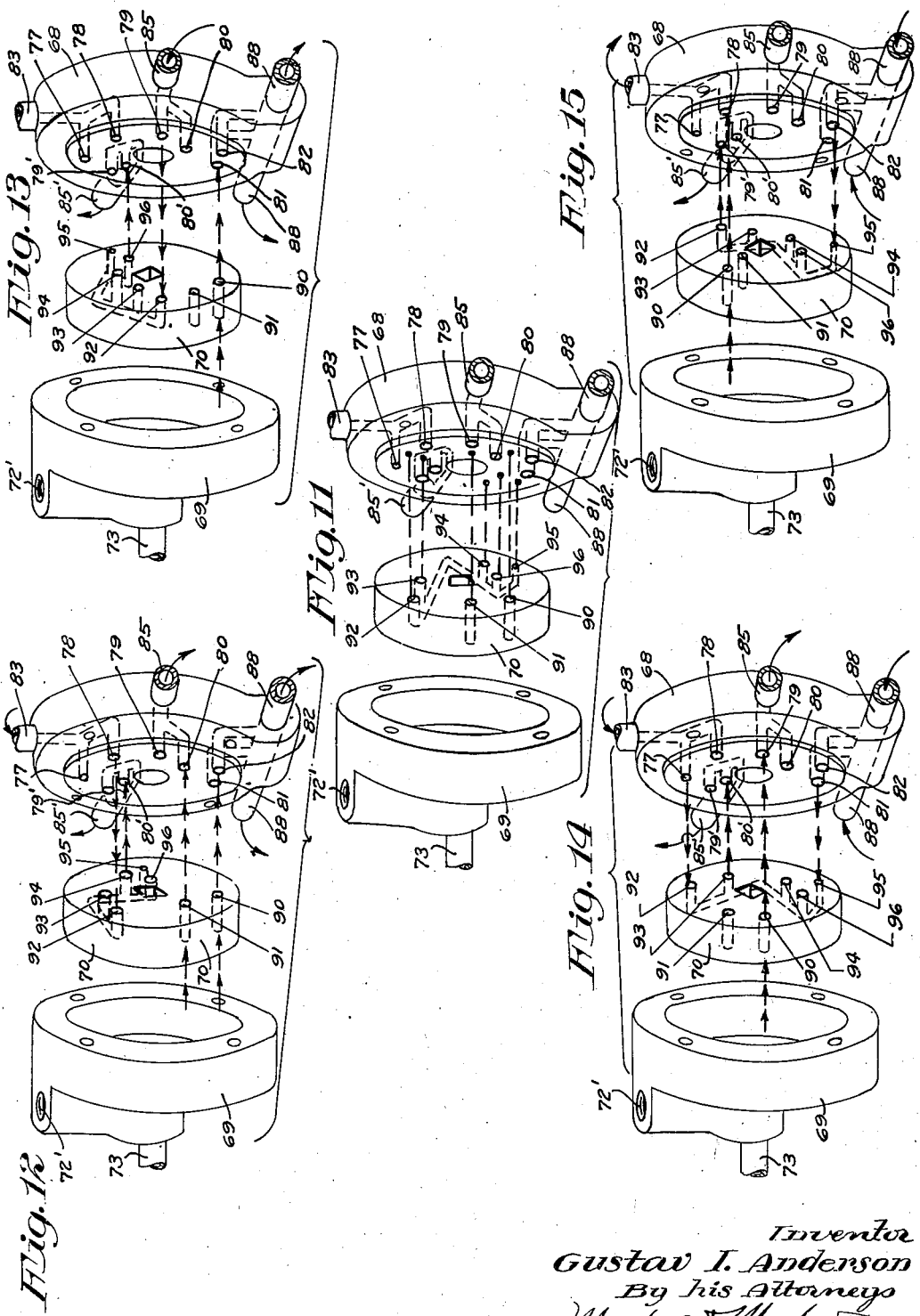

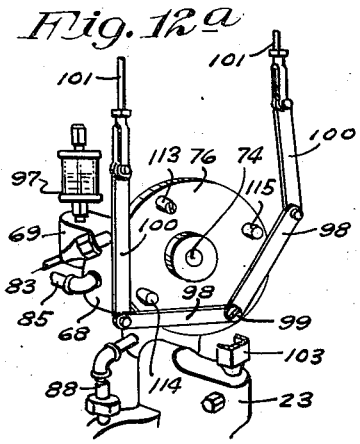

UNITED STATES PATENT OFFICE 2,250,740

TIRE CASING SPREADER

Gustav I. Anderson, Minneapolis, Minn., assignor to Ke Hawke Manufacturing Company, Minneapolis, Minn., a corporation of Minnesota Application February 3, 1939, Serial No. 254,412

19 Claims. (Cl. 154—9)

This invention relates to devices generally known as tire casing spreaders, and generally stated has for its object to improve the same in respect to mechanical construction and operations for rapid and efficient work, in the handling of modern or present day tires, in inspecting and repairing tire casings.

Particularly, the invention provides a tire spreader that is adapted to handle very large and very heavy tire casings such as now used on trucks, tractors and the like. These large tire casings frequently weigh as much as two or three hundred pounds or even more, and the handling and spreading of such casings require not only strong but powerful mechanism, in which the several necessary operations of the machine cannot be performed rapidly or with commercial efficiency by manual power and, hence, requires mechanical motive power.

In this improved machine there is employed fluid pressure motors, preferably cylinder and piston air actuated structures, which are combined with casing manipulating devices of novel construction and relative arrangement, whereby the largest and heaviest casing, as well as lighter ones, can be handled, spread and inspected with that ease and rapidity required for commercial success and economy.

A commercial form of the machine is illustrated in the accompanying drawings wherein like characters indicate like parts throughout the several views.

Referring to the drawings:

Fig. 2 is a view corresponding to Fig. 1 but showing the spreader and tire after the initial movement of the spreader has been performed.

Fig. 3 is a perspective of the spreader with a portion of the supporting base removed and with the parts viewed from the rear of the spreader;

Fig. 4 is a perspective with parts broken away showing the spreader head and associated parts on a larger scale than in Figs. 1 and 2;

Fig. 5 is a view similar to Fig. 4 but with some parts omitted and illustrating the different positions of the parts from that shown in Fig. 4;

Fig. 6 is a perspective of most of the parts shown in Fig. 4 viewed from the rear;

Fig. 11 is a schematic perspective showing the body, valve and head of the control valve mechanism illustrating the neutral position of the valve;

Figs. 12, 13, 14 and 15 are views corresponding to Fig. 11, but illustrating step by step different operative positions of the valve;

Figs. 11a, 12a, 13a, 14a and 15a are perspective views showing the valve operating connections in positions corresponding respectively to Figs. 11, 12, 13, 14 and 15;

Fig. 16 is a view in side elevation illustrating the various positions of the control lever which operates the control valve.

Figure 7:
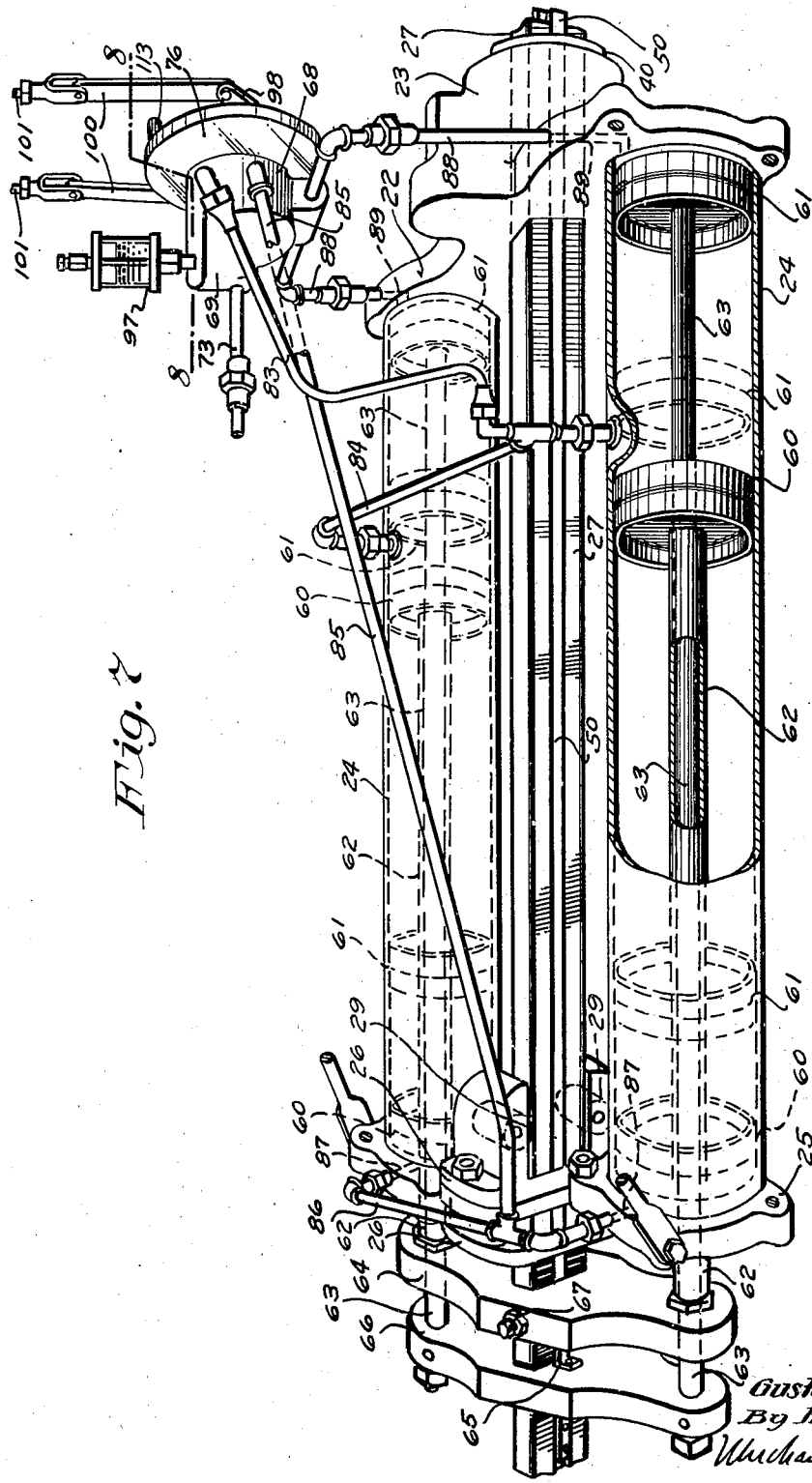
Fig. 7 is a perspective partly in section and partly in full showing particularly the construction and arrangement of the air actuated motor, the parts primarily actuated thereby and connection to valve mechanism for controlling the motor operations.

The supporting frame for the entire machine is preferably in the form of a column or heavy post 20 having a spider-like base 21. Formed as a part of or otherwise rigidly secured to the upper end of the column 20 is a head plate 22 formed with a centrally located hub 23, best shown in Figs. 2 and 7. Again as best shown in Fig. 7, the laterally spaced horizontally disposed cylinders 24 are rigidly secured to and at their front ends are closed by the head plate 22. Rigidly secured to and closing the rear ends of the cylinders 24 are cylinder heads 25 which, in turn, are rigidly secured to a rear head or bearing plate 26.

Mounted to slide through the hub 23 of the front head plate 22 and through the central portion of the rear head plate 26 is a primary thrust bar or slide 27. As shown in Fig. 4 the hub 23 is provided with a roller 28, and as shown in Fig. 7 the rear head plate 26 is provided with rollers 29 to reduce the friction between the primary thrust bar 27 and the said head plates.

At its extreme front and the primary thrust bar 27 terminates in a trunnion 27' on which is rotatably mounted a hub 30 having radial arms 30', to the outer ends of which is rigidly secured an annular bearing head 31, see particularly Figs. 4, 5 and 6. Rigidly secured on the trunnion 27' just outward of the hub 30 is a retaining collar 32. This bearing head 31 is provided with outstanding guide sleeves 33, as shown four in number, located 90° apart; and mounted in the guide sleeves 33 to move radially in respect to the axis of the head 31 are grapple projecting plungers 34. These plungers 34, at their outer ends, are rigidly secured to sleeve-like heads 35. Extended through the heads 25 both forwardly and rearwardly therefrom are grapple carrying rods 36 on which the sleeve-like heads freely slide. These rods 36 are horizontally disposed and are parallel and are located 90° apart; and at their rear ends the rods are secured to the outer ends of adjustable arms made up of overlapping bars or members 37 and 38. The inner ends of the bars 38 are secured to a hub 39, see particularly Figs. 3 and 4, that is rotatable on a trunnion 40, that is a fixed part of the hub 23. Sliding movements of the bars 37 on the bars 38 is permitted and controlled by slots 41 in the former and headed screws 42, or the like, that work in said slots and are secured to the bars 38.

Rigidly secured to the extreme front ends of the grapple-carrying rods 36 are capping brackets 43 having outstanding lugs that are tied to outstanding lugs on the extreme outer ends of the bars 37, by tie rods 44, best shown in Fig. 3.

Figure 1:
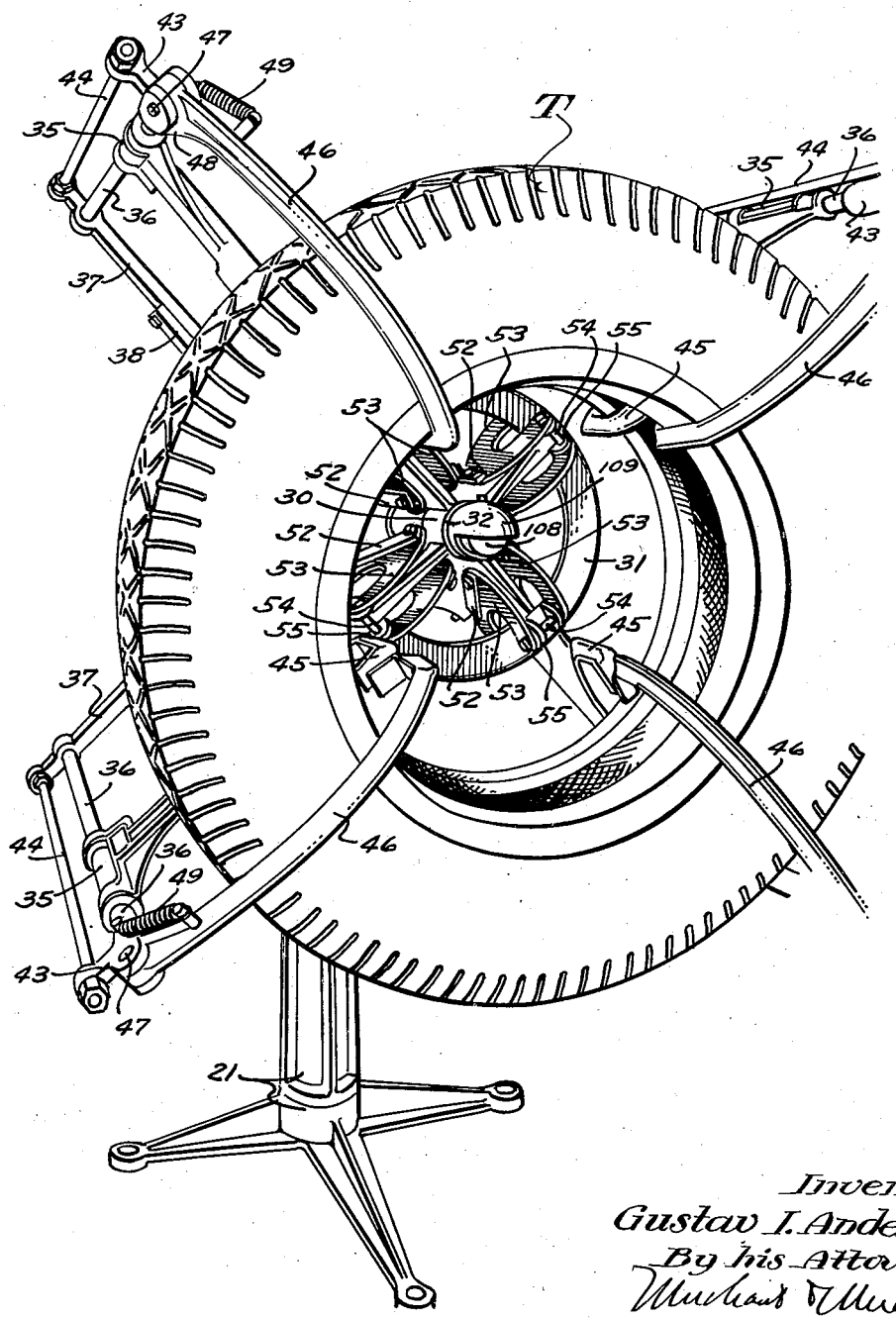
Fig. 1 is a perspective of the complete spreader as viewed from the front thereof, showing the initial condition of the tire applied in position for spreading.

Inner hook-like grapples 45 are rigidly secured to the sleeves 35 and to the plunger-acting rods 34, and project radially inward and terminate in hook-like ends for engagement with the inner surfaces of the beads of the tire casing. In the drawings Figs. 1, 2 and 3, the tire casing is indicated as an entirety by the character T.

Companion grapples 46, similar to the grapples 45, are pivotally connected to lugs on the capping brackets 43 at 47. These grapples 46 have stop projections 48 that engage the brackets 43 and limit the movements of the grapples 46 towards the relatively fixed grapples 45. The grapples 46 are yieldingly held in position, best shown in Figs. 1, 2 and 3, by coil springs 49 attached thereto and to the respective brackets 43.

In the construction so far described, the grapples 46 are fixed against movement longitudinally of the primary thrust bar 27 and of the axis of the rotary structure made up of the annular bearing head 32, the arms 37 and 38, and the parts carried thereby. The annular bearing 32, plungers 34, and the sleeve-like heads 35 and grapples 45, are, however, movable toward and from the grapples 46 under sliding movements of the primary thrust bar 27; and these relative movements of the grapples 45, the one away from the other, function in spreading the tire casing, all as will be hereinafter more fully described.

Simultaneous movements of the grapples 45 and 46 toward the axis of the tire casing and of the primary bar 27 are produced by novel mechanism which will now be particularly described. As an important element for the purpose just noted, there is provided a secondary thrust bar 50 which, as shown, is mounted to slide in a longitudinal groove formed in the primary bar 27. Mounted to slide on the primary bar 27 and fixed to the secondary bar 50 for sliding movements therewith is a grooved collar 51a in the groove of which is swiveled a plate-like thrust head 51 and which, as shown, has outstanding arms or projections, see particularly Fig. 6. The arms or projections of this thrust head 51 are connected by links 52 to the elbows or intermediate portions of bell crank levers 53 and by means of pivot pins 54, see particularly Figs. 3, 4, 5 and 6, to hinge lugs or projections 55 on the front face of the annular bearing head 32. Preferably, and as shown, these bell crank levers 53 are made in duplicate by laterally spaced bars that straddle the arms 31 of the hub 30. These bell crank levers, as will be noted, extend through openings in the bearing head 32, and their rear arms are pivotally connected, see particularly Fig. 6, by pivot pins 56 to the inner end of links 57, the outer ends of which work through slots 58 in the backs of the guide sleeves 33 of the bearing head 32 and are pivotally connected at 59 to the plungers 34.

In the construction just described, when the secondary thrust bar and its head 51 are moved rearward, the plungers 34, and hence the grapples 45 and 46, will be moved radially outward and conversely when said thrust bar 50 and its head 51 are moved forward, the plungers and the grapples will be moved radially inward or toward the axis of the rotary part of the device.

The cylinders 24 heretofore noted constitute elements of a pair of twin air motors that afford the power for performing the various operations of the tire spreader. Within each of these cylinders, see particularly Fig. 7, are two pistons 60 and 61. The pistons 60 have tubular rods or stems 62 that work through the respective cylinder heads 25, the bearing plate or head 26; and the pistons 61 have stems 63 that work through the tubular piston rods or stems 62. At their projecting ends the tubular piston rods 62 are tied together and rigidly secured to the primary thrust bar 27 by a cross head 64; and the projecting ends of the piston rods 63 are tied together and secured at 65 to the rear end of the secondary thrust bar 50 by a cross head 66 that slides freely on the primary bar 27. The cross head 64 is shown as rigidly but adjustably secured to the primary bar 27 by a set screw 67. The said parts 60 to 67 are best shown in Fig. 7.

The two or twin cylinder and piston motors described are arranged to be operated by compressed air or steam, preferably the former. Through a control valve and connections which will now be described, attention is directed particularly to Figs. 7 to 16 inclusive and 11a to 15a inclusive.

The control valve is shown as made up of two detachably but rigidly connected sections 68 and 69 and rotary or oscillatory valve head 70. The section 69 is formed with the valve cavity that contains the valve head 70, and the section 68 is formed with a valve seat against which the flat face of valve head 70 is tightly pressed by a coil spring 71, best shown in Fig. 8. The air receiving chamber 72 of section 69 receives air under pressure from a suitable source, not shown, through an air supply pipe 73. For oscillating the valve head 70 a short stub shaft 74 is extended through and journaled in the section 68 and is provided at its inner end with a square or angular shank 75 seated in the valve. Secured to the outer end of the shaft 74 is a disc-like head or flange 76, best shown in Figs. 8 and 11a to 15a inclusive.

The valve seat forming section 68 is provided with connected ports 77—78, with connected ports 79—80, with connected ports 79'—80' and with connected ports 81—82.

The ports 77 and 78 are connected by an air pipe 83 to a transverse air pipe 84 (see Fig. 7), the ends of which latter tap the two cylinders 24 at a point between the pistons 60 and 61.

The ports 79 and 80 and ports 79' and 80' are connected by air pipe 85 to a transverse air pipe 86, the ends of which tap the rear ends of cylinders 24 through ports 87 formed in the rear cylinder heads 25.

The ports 81 and 82 are connected by branch pipes 88 to the front ends of the cylinders 24 through ports 89 formed in the plate 22 which, it will be remembered, affords the front end heads for the said cylinders.

The rotary valve head 70 is formed with ports 90 and 91 that extend completely through the same and it is formed with a group of ports 92, 93, 94, 95 and 96 that open at the face of the valve, but are interconnected in the body of the valve.

Figure 8:
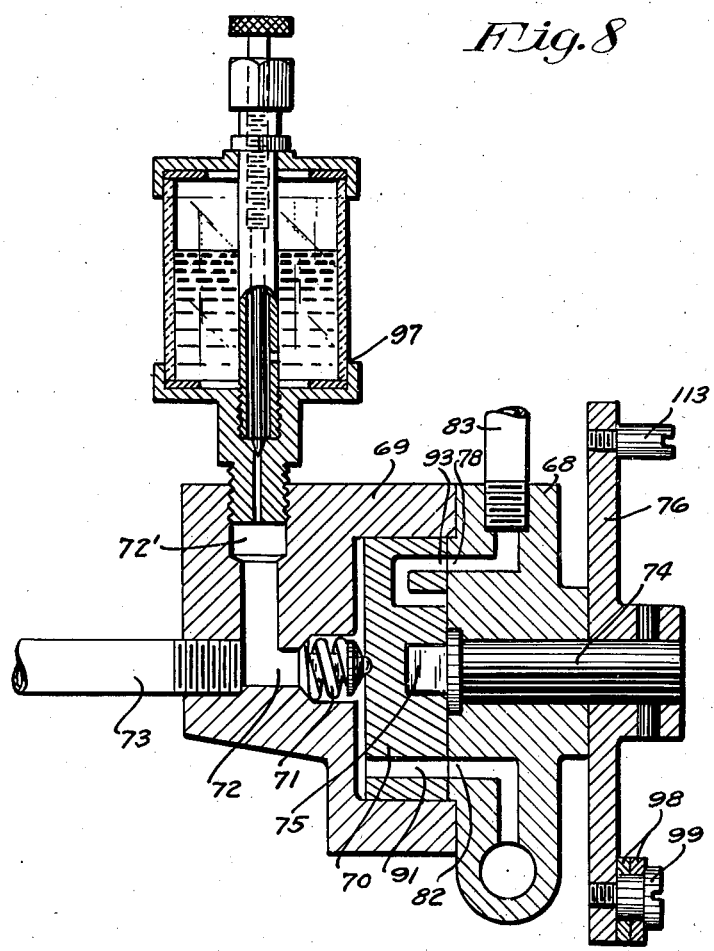
Fig. 8 is a detail in vertical section taken on the line 8—8 of Fig. 7.
Figure 10:
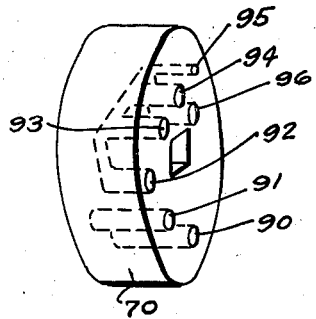
Fig. 10 is a perspective showing the control valve removed from its seat and looking at the face thereof.
Figure 9:
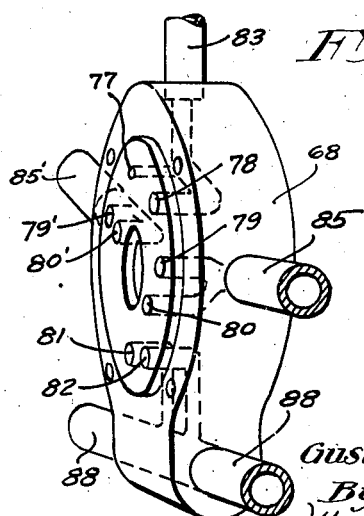
Fig. 9 is a perspective showing the body of the control valve structure looking at the face thereof.

In Fig. 8 there is shown an oil cup 97, the shank of which is threaded into the top of the case section 69 and drips oil into the air chamber 72 through a port 72'.

For imparting oscillatory movements to the disc-like flange 76 and hence to the valve head to perform operations hereinafter traced in detail, the following connections are illustrated. A pair of links 98 are pivotally connected by stub 99 to an outer portion of the disc 76. The free ends of the links 98 are connected by links 100 to the lower ends of rods 101, the upper ends of which are connected to oppositely acting bell cranks 102, which, as shown, are supported from a mast 103 secured to and rising from the head 23, and braced from the rear head cylinder heads 25, by guide rods 104. The oppositely projecting arms of the bell cranks 102 are connected by rods 105 to the upper ends of an actuating lever 106, which, as shown, is pivoted to the front end of a fulcrum bar 107 that is projected from the upper portion of the mast 103.

In Figs. 1, 4, 5 and 6 there is shown an electric light bulb 108 applied to the extreme front end of the trunnion 27' and covered by a shield 109 that projects the light downward into the tire. In practice the light bulb 108 is located in a circuit 110 that includes a normally open push button switch 111 having a projecting stem 112. In Fig. 3 only a part of the circuit 110 is shown but the manner of connecting a light bulb to such a circuit is, of course, obvious. The body of this push button 111 is carried by the main thrust bar 27 and the stem 112 of which is adapted to be engaged with the plate 26 when said bar 27 is moved forward to position the ends of the grapples 45 and 46 within the opening of the tire casing.

By reference to Fig. 3, it will be noted that the outside hooks or grapples 46 can be turned to the dotted line positions shown in Fig. 3.

*Operation*

Under manipulation of the control level 106 the links 98 act on the pins 113, 114 and 115 of the valve connected disc 76 as illustrated and best shown in Figs. 11 to 15 inclusive, Figs. 11a to 15a inclusive and Fig. 16.

In Fig. 16 the neutral position of lever 106 is indicated by full lines and is further marked with the designation 11'. In this position of the lever the links 98 will be as shown in Fig. 11a, and the relative position of the rotary valve 70 in respect to its seat will be shown in Fig. 11, by reference to which it will be noted that all of the ports both of the valve and its seat are then closed so that there will be no flow of the compressed air or motive fluid.

When lever 106 is moved to position indicated by dotted lines 12' in Fig. 16, the links 98 will be as shown in Fig. 12a and said links acting on the pins 113 and 114 will set the rotary valve 70 in respect to its seat to a position as shown in Fig. 12.

In this position, Fig. 12, air under pressure is admitted to pipes 85 and 83 as follows: To pipe 85 through valve port 91 and valve seat port 80 and to pipes 88 through valve port 90 and valve seat port 82; and this simultaneously introduces air into the opposite ends of the two cylinders 24. The air introduced into the rear ends of said cylinders prevents pistons 60 from being moved while the air introduced into the front ends of the cylinders causes pistons 61 to move rearward. At the same time the cylinder space between the pistons is opened to atmosphere through pipes 84 and 83, valve seat port 78, valve ports 92 and 94 and valve seat port 80' to exhaust pipe 85'. The above described movement of the pistons 61 moves cross head 66 secondary thrust bar 50 rearward and head 51, thereby oscillating the bell crank levers 53 and moving the plunger and the grapples 45 and 46 radially outward.

While the grapples 46 are moved pivotally outward, as shown by dotted lines in Fig. 3, the tire casing is hung on the upper members of the grapple 45, and this positions the tire casing out of line with or eccentric to the axis of the rotary head of the tire spreader. The outward movement of the grapples just above described, however, moves the casing from the position shown in Fig. 1 into the position shown in Fig. 2, where the tire casing is then concentric to the axis of the rotary head of the spreader. It has now been noted that the first function of the tire spreader is to engage and center the tire casing.

As will presently be noted, the next function is to spread the tire casing laterally and this is done by a movement of the lever 106 to the position indicated by dotted lines marked 13' in Fig. 16. When the lever is moved to position 13' the valve actuating disc 76 will be moved to the position 13a and the valve will then be set in the position shown in Fig. 13.

In the position of the valve shown in Fig. 13, the flow of air is from supply through valve port 90, valve seat port 81 and pipes 88 to the front ends of the two cylinders 24. At the same time the rear ends of the cylinders will be open to exhaust through pipes 86 and 85, valve seat ports 79, valve ports 92 and 96, valve seat port 80' and from thence to exhaust pipe 85'. At this time the pipes 84 and 83 are, by the valve, closed both against admission of air and against exhaust.

With the valve positioned as just described, the air introduced into the front ends of the cylinders will simultaneosly move both of the pistons 60 and 61 rearward. Movement of the piston 60 causes the cross head 64 and main thrust bar 27 to be moved rearward. This rearward movement of said primary thrust bar carries the inside or rear hooks 45 rearward and away from the relatively fixed outside hooks or grapples 46, and this spreads the tire casing so that it may be thoroughly inspected.

It will be understood that while the rearward movements of the pistons 60 and 61 are simultaneously made, they will not necessarily move the same distances.

The movement of the piston 61 causes radial outward movement of the grapples while the movement of the piston 60 causes lateral separation of the grapples and spreading of the tires, and the amount of said relative movement imparted to the pistons 60 and 61 will be automatically adapted to the forces required to accomplish the two independent movements.

The closing and release of the tire is performed by the following operations: Lever 106 is moved back past neutral or full line position to the position indicated at 14', in Fig. 16, and this sets the valve actuating disc 76 in the position shown in Fig. 14a thereby moving the rotary valve to the relative position shown in Fig. 14. In the position of the parts shown in Fig. 14, air under pressure is admitted to the outer ends of the cylinders 24 as follows: Through valve port 90, valve seat port 79 and pipes 85 and 86, and at the same time the rear ends of the cylinders are open to exhaust through pipes 88, valve seat port 81, valve ports 95 and 93 and valve seat port 80' to exhaust pipe 85'. At the same time the cylinder space between the pistons is opened to exhaust through pipes 84 and 83, valve seat port 77, valve ports 92 and 93 and valve seat port 80' to exhaust pipe 85'.

In the position of the valve shown in Fig. 14, the two pistons will be moved forward in the cylinders but will not be opened to their normal extent. To move the two pistons to their normal positions shown in Fig. 7, the lever 106 is moved to the position shown at 15' in Fig. 16 thereby moving the valve actuating disc 76 to the position shown in Fig. 15a and causing the valve 70 to be moved to the relative position shown in Fig. 15.

With the valve positioned as shown in Fig. 15, the front ends of the cylinders 24 are open to exhaust through valve seat port 82, valve ports 95 and 92 to valve seat port 79' and from thence to exhaust pipe 85'. At this time in the said position of the valve, air under pressure is introduced into the cylinder space between the pistons through valve ports 90, valve seat port 78 and pipes 83 and 84. This introduction of the air into cylinder space between the pistons took place while the front ends of the cylinders are closed both against the exhaust and the admission of air, and hence the introduction of air under pressure into the cylinder between the pistons while the front ends of the cylinders are open to exhaust serves to set the two pistons in their normal positions shown in Fig. 7. Also, it will be understood that when the pistons have been restored to their normal positions shown in Fig. 7 the various movable parts of the apparatus, including the grapples or hooks 45 and 46, will be returned to the positions shown in Fig. 1, so that the tire may be readily removed when the grapples have been moved pivotally outward.

From the foregoing it will be evident that the preferred form of the mechanism described may be modified within the scope of the invention herein disclosed and claimed. In the preferred structure illustrated a rotary bearing head and connections therefrom including the plungers 34, grapple-carrying rods 36 and extensible arms 37—38 constitute a very efficient and desirable form of carrier for the inner and outer sets of grapples.

What I claim is:

1. A device of the class described comprising a support, a carrier rotatably mounted on said support, inner and outer tire casing-engaging grapples mounted on said carrier for rotation therewith and for axial separation and for radial movements thereon, primary and secondary thrust bars at the axis of rotation of said carrier, said primary bar having connections imparting lateral separation of said sets of grapples and said secondary thrust bar having connections for imparting radial inward and outward movements to said grapples.

2. The structure defined in claim 1 in further combination with fluid-actuated motor means for independently moving said primary and secondary thrust bars.

3. In a device of the class described, a supporting frame, primary and secondary thrust bars mounted for parallel sliding movements in said frame, a bearing head carried by but journaled to the front end of said primary thrust bar, plungers mounted in said bearing ring for movements radially thereof, a head secured to the front end of said secondary thrust bar, connections between said last noted head and said plungers for imparting radial movements to the latter, means for axially moving said primary and thrust bar, inner and outer grapples carried by the outer ends of said plungers, both movable radially with said plungers, the inside grapples being movable with said plungers, bearing head and primary thrust bar, toward and from the outer grapples, and means for holding the outer grapples against movements axially of said bearing head.

4. The structure defined in claim 3 in which the means for moving said primary and secondary grapples includes a cylinder having two pistons with extended rods, one piston rod being connected to said primary thrust bar and the other being connected to said secondary thrust bar, and means for controlling admission into and exhaust of motive fluid to and from said cylinder, to accomplish the movements indicated.

5. The structure defined in claim 3 in which the connection between the head of said thrust bar and said plungers includes bell crank levers pivoted to said rotary bearing head, and links connecting said bell crank levers to the head of said secondary thrust bar and to the respective plungers.

6. The structure defined in claim 3 in which the means for moving said primary and thrust bar includes a cylinder having two pistons therein, said pistons having concentric rods, the one connected to said primary thrust bar and the other to said secondary thrust bar, and manually controlled valve mechanism for controlling the admission and exhaust of motive fluid to said cylinder to accomplish the means indicated.

7. In a device of the class described, a supporting frame member having a hub-like portion, primary and secondary thrust bars slidably mounted in said hub-like portion, circumferentially spaced endwise adjustable supporting arms rotating from said hub, parallel circumferentially spaced guide bars projected from the outer ends of said expansible arms parallel to the axis of said hub member, a bearing head applied to the front end of said primary thrust bar, plungers mounted on and radiating from said bearing head, sleeves and inside grapples connected to the outer ends of said plungers, with said sleeves slidably mounted on said guide bars, outside grapples applied to the ends of said guide bars, a thrust head slidable on the said primary guide bar and connected to said secondary thrust bar for sliding movements with the latter, and connections between said thrust head and plungers, whereby sliding movements of said secondary thrust bar, in respect to said primary thrust bar, will impart radially inward and outward movements to said plungers and inside and outside grapples.

8. The structure defined in claim 7 in which the bearing head applied to the front end of said primary thrust bar is rotatable thereon but movable axially therewith, and in which the thrust head of said secondary thrust bar is slidable on but rotatable around said primary bar.

9. The structure defined in claim 7 in which the connections between said plungers and the thrust head of said secondary bar include bell cranks pivoted to said bearing head, and links connecting said bell cranks to said plungers and to said thrust head.

10. The structure defined in claim 7 in which the connections between said plungers and the thrust head of said secondary bar include bell cranks pivoted to said bearing head, and links connecting said bell cranks to said plungers and to said thrust head, and in which said bearing head is rotatable on said primary thrust bar but movable axially therewith and said thrust head is rotatable around said primary thrust bar but slidable thereon under sliding movements of said secondary thrust bar.

11. The structure defined in claim 7 in further combination with fluid pressure motor means having independent connections to said primary and secondary bars for independently sliding the same.

12. In a device of the class described, a supporting frame member having a hub-like portion, primary and secondary thrust bars slidably mounted through said hub-like portion, an annular bearing head rotatably mounted on the front end of said primary thrust bar, plungers radially movable in said bearing head, inside and outside grapples connected to the outer ends of said plungers for radial movements toward and from the axis of said head, and a thrust head rotatably and slidably mounted on said primary thrust bar and connected to said secondary thrust bar for sliding movements therewith, connections between said thrust head and said plungers for imparting radial movements thereto, means anchoring the outside grapples against movements longitudinally of said thrust bars, and means for imparting independent sliding movements to said primary and secondary thrust bars.

13. The structure defined in claim 12 in which the connections between said thrust head and plungers include bell crank levers pivoted to said bearing head, and links connecting said bell crank levers to said thrust head and plungers.

14. The structure defined in claim 12 in which the means for imparting independent endwise movements to said primary and secondary thrust bars includes a cylinder and piston motor in which the cylinder is provided with two pistons, one connected to said primary bar and the other to said secondary bar.

15. In a device of the class described, a supporting frame member having a hub-like portion, primary and secondary thrust bars slidably mounted through said hub-like portion, an annular bearing head rotatably mounted on the front end of said primary thrust bar, plungers radially movable in said bearing head, a hub rotatably mounted on the hub-like portion of said frame member and provided with circumferentially spaced radially extensible arms, circumferentially spaced parallel guide rods secured to the outer ends of said extensible arms, sleeves slidably mounted on said guide rods, inside grapples connected to said sleeves and the outer ends of said plungers, outside grapples secured to the extended ends of said guide rods, said extensible arms serving to anchor said guide rods and outside grapples against movement longitudinally of said thrust bars, a thrust head rotatably slidably mounted on said primary thrust bar and secured to said secondary thrust bar for sliding movements therewith, and connections between said thrust head and plungers for moving the latter when said secondary thrust bar is moved longitudinally.

16. In a device of the class described, a supporting frame member having a hub-like portion, primary and secondary thrust bars slidably mounted through said hub-like portion, an annular bearing head rotatably mounted on the front end of said primary thrust bar, plungers radially movable in said bearing head, a hub rotatably mounted on the hub-like portion of said frame member and provided with circumferentially spaced radially extensible arms, circumferentially spaced parallel guide rods secured to the outer ends of said extensible arms, sleeves slidably mounted on said guide rods, inside grapples connected to said sleeves and the outer ends of said plungers, outside grapples secured to the extended ends of said guide rods, said extensible arms serving to anchor said guide rods and outside grapples against movement longitudinally of said thrust bars, and thrust head rotatably and slidably mounted on said primary thrust bar and secured to said secondary thrust bar for sliding movements therewith, bell crank levers pivoted to said bearing head and links connecting said bell crank levers to said plungers and to said thrust head.

17. The structure defied in claim 15 in further combination with power means for independently moving said primary and secondary thrust bar.

18. The structure defined in claim 15 in further combination with power means for independently moving said primary and secondary thrust bars, said power means including a cylinder having two pistons therein with concentric piston rods, one connected to said primary thrust bar and the other connected to said secondary thrust bar.

19. The structure defined in claim 15 in further combination with power means for independently moving said primary and secondary thrust bars, said power means including a cylinder having two pistons therein with concentric piston rods, one connected to said primary thrust bar and the other connected to said secondary thrust bar, and fluid pressure controlling valve mechanism for controlling the admission and exhaust of motive fluid to and from the ends and intermediate portion of said cylinder.

GUSTAV I. ANDERSON.